(12) United States Patent
Van Gestel

(10) Patent No.: US 7,895,391 B2
(45) Date of Patent: Feb. 22, 2011

(54) METHOD FOR RECORDING INFORMATION ON A RECORD MEDIUM, RECORD MEDIUM CONTAINING INFORMATION, AND METHOD AND DEVICE FOR READING INFORMATION FROM A RECORD MEDIUM

(75) Inventor: Wilhelmus Jacobus Van Gestel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 526 days.

(21) Appl. No.: 10/596,515

(22) PCT Filed: Dec. 16, 2004

(86) PCT No.: PCT/IB2004/052826
§ 371 (c)(1),
(2), (4) Date: Jun. 15, 2006

(87) PCT Pub. No.: WO2005/064612
PCT Pub. Date: Jul. 14, 2005

(65) Prior Publication Data
US 2007/0206928 A1    Sep. 6, 2007

(30) Foreign Application Priority Data
Dec. 22, 2003   (EP) .................................. 03104908

(51) Int. Cl.
*G06F 12/00* (2006.01)
*G06F 13/00* (2006.01)
*G06F 13/28* (2006.01)
(52) U.S. Cl. ........................ 711/102; 386/45; 386/46; 386/70; 386/125; 711/111; 711/157
(58) Field of Classification Search .................. 386/46, 386/125; 711/102, 111, 156
See application file for complete search history.

(56) References Cited

U.S. PATENT DOCUMENTS

| | | | | |
|---|---|---|---|---|
| 5,317,397 A * | 5/1994 | Odaka et al. | ............ | 375/240.15 |
| 5,784,528 A | 7/1998 | Yamane et al. | | |
| 5,999,698 A | 12/1999 | Nakai et al. | | |
| 2003/0113096 A1 * | 6/2003 | Taira et al. | ..................... | 386/46 |
| 2003/0235404 A1 * | 12/2003 | Seo et al. | ....................... | 386/95 |
| 2004/0096196 A1 * | 5/2004 | Seo et al. | ....................... | 386/98 |

(Continued)

FOREIGN PATENT DOCUMENTS

EP    0831647 A1    3/1998

(Continued)

*Primary Examiner*—Stephen C Elmore
*Assistant Examiner*—Mark A Giardino, Jr.

(57) ABSTRACT

A method for writing an audio/video information stream to an optical disc, and for reading the information from disc. The information stream includes alternative video parts which are recorded in an interleaved manner; an interleaved unit includes angle blocks, each angle block including one portion of each of the alternative video stream parts. For each video portion, entry points are defined. A user is allowed to change from one video stream to another video stream at any moment during the playback of a video portion; the change will be effected at the first entry point after the user command. Thus, it is not necessary to wait until the video portion has been completely played back; thus, it is possible to define large angle block lengths, so that during normal play the jump frequency is reduced.

10 Claims, 11 Drawing Sheets

U.S. PATENT DOCUMENTS

| | | | |
|---|---|---|---|
| 2004/0165862 A1* | 8/2004 | Jung et al. | 386/69 |
| 2004/0175111 A1 | 9/2004 | Jung et al. | |
| 2004/0179823 A1 | 9/2004 | Jung et al. | |

FOREIGN PATENT DOCUMENTS

| | | |
|---|---|---|
| EP | 1521463 A1 | 4/2005 |
| JP | 10027461 A | 1/1998 |
| JP | 2000050210 A | 2/2000 |
| JP | 2003121595 A | 4/2003 |
| JP | 2003324689 A | 11/2003 |
| JP | 2004328450 A | 11/2004 |
| JP | 2005033618 A | 3/2005 |
| WO | 2005004147 A1 | 1/2005 |

\* cited by examiner

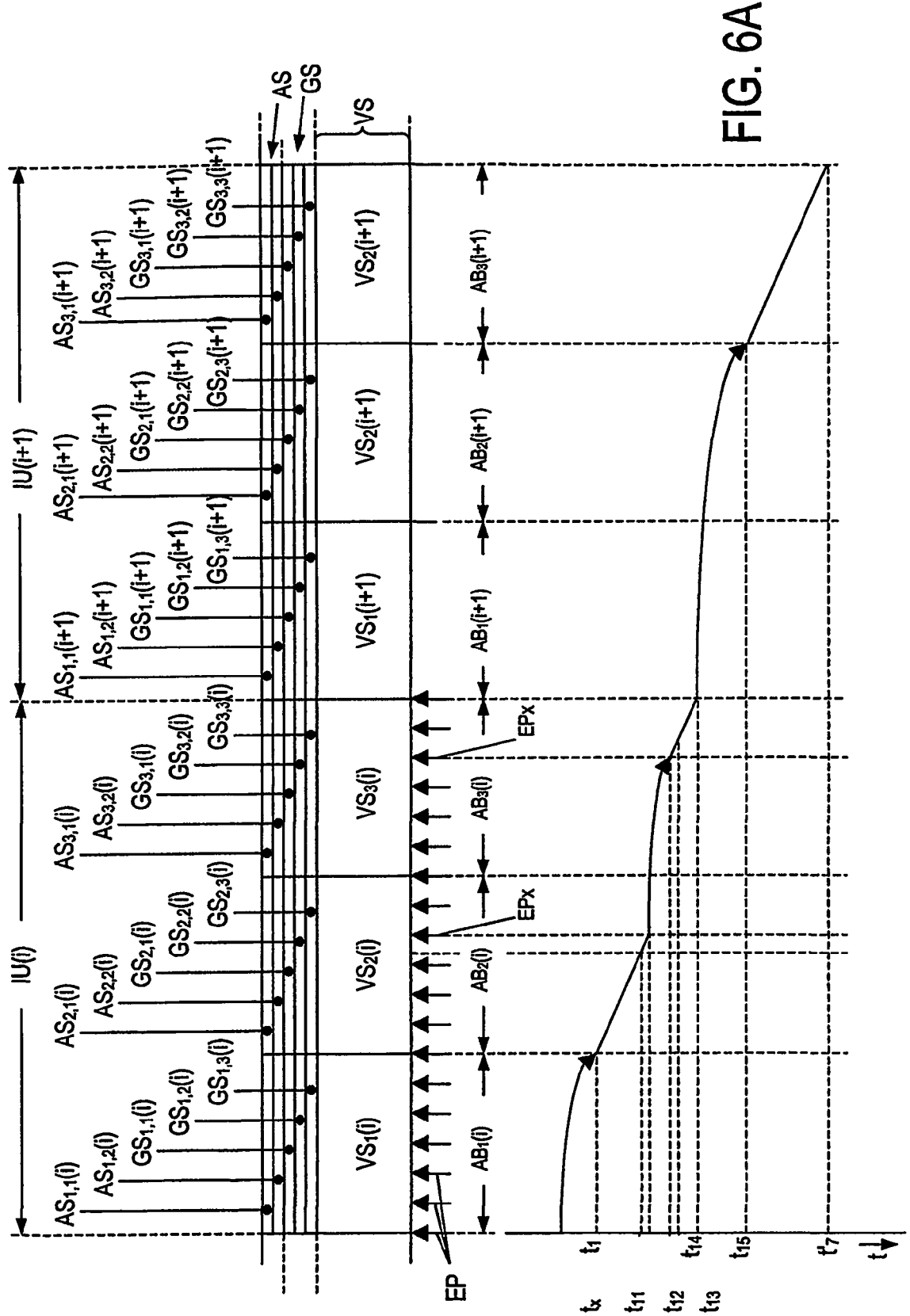

METHOD FOR RECORDING INFORMATION ON A RECORD MEDIUM, RECORD MEDIUM CONTAINING INFORMATION, AND METHOD AND DEVICE FOR READING INFORMATION FROM A RECORD MEDIUM

FIELD OF THE INVENTION

The present invention relates in general to the field of recording information on a record medium and, conversely, reading the recorded information from the record medium.

More particularly, the present invention relates to the field of optical recording, in which case the record medium typically is an optical disc, but the gist of the present invention is not restricted to optically recording information on a disc.

Further, the present invention relates particularly to the field of recording an audio stream and/or a video stream, but the gist of the present invention is not restricted to such use. As will become clearer in the following, the present invention is applicable in more cases where an information stream has a plurality of alternative parts and one or more common parts.

Optical discs and disc drives have been developed according to different standards or formats, such as for instance CD standard, DVD standard, etc. A relatively new standard is BD (Blu-Ray Disc). Specifically, the present invention relates to the field of recording and reading BD-ROM, and the invention will be explained hereinafter specifically for this exemplary application, but it is to be noted that it is not intended to restrict the scope of the invention to BD-ROM.

BACKGROUND OF THE INVENTION

As is commonly known, an optical storage disc comprises at least one track, either in the form of a continuous spiral or in the form of multiple concentric circles, of storage space where information may be stored in the form of a data pattern. Optical discs may be read-only type, where information is recorded during manufacturing, which information can only be read by a user. The optical storage disc may also be a writeable type, where information may be stored by a user. Since the technology of optical discs in general, the way in which information can be stored in an optical disc, and the way in which optical data can be read from an optical disc, is commonly known, it is not necessary here to describe this technology in more detail.

Optical discs have found widespread use as information carrier, not only for storing computer data, but also for making audio and/or video recordings. Apparatus are available for allowing a user to make his own recordings on writeable discs. Also, audio publishing companies or video publishing companies publish pre-recorded discs, which are read-only discs (ROM); play-back apparatus are available for allowing a user to play such discs. In such play-back apparatus, indicated hereinafter simply as player, a disc drive component reads and decodes the data recorded on disc, and a video stream and/or audio stream is generated, suitable for display via a display device such as a television apparatus, a monitor, a loudspeaker, etc. This is explained in the following example.

A movie may contain several elements, indicated as follows:
  Moving pictures. i.e. the actual pictures of the movie, to be displayed on the TV screen. The contents of the moving pictures are stored in a video elementary stream.
  Graphics pictures. Graphics pictures are overlayed on the moving pictures like a picture-in-picture presentation. Graphics picture are used for transmitting subtitles. They may consist of background graphics (e.g. a still picture) and some text. The contents of the graphics pictures are stored in a graphics elementary stream, so a user has the option of viewing the movie with or without graphics. Usually, a user is given the option to choose a language, in which case different graphics pictures are provided, associated with different languages. In such case, the movie is accompanied with a set of multiple graphics elementary streams, one for each language.
  Audio signals. The audio signal of a movie consists of background audio with spoken text and this combination is stored in an audio elementary stream. Usually, a user is given the option to choose a language, in which case the spoken text is different for different languages while the background audio is the same for all languages. In such case, the movie is accompanied with a set of multiple audio elementary streams, one for each language.

A combination of multiple elementary streams (for instance: moving pictures+graphics+audio) can be transmitted in one Transport stream. Each transport stream is stored as a separate file.

Traditionally, an information carrier contains only one version of the movie. With the ongoing development of optical discs, especially the increase in data storage capacity, it has become possible for the information carrier to contain two or more versions of the movie, allowing a user to select which version he wishes to see. For instance, one user may wish to see the movie in its original version, but another user may wish to have subtitles. Yet another user may prefer to hear the spoken text in his own language.

According to the state of the art, especially the well-known DVD-VIDEO standard, several different versions of the audio elementary stream and the graphics elementary stream are recorded in one transport stream, packets of the elementary streams being multiplexed in the transport stream. Depending on a user's choice, only one of the several different versions of the audio elementary stream is selected for decoding during playback, and only one of the several different versions of the graphics elementary stream is selected for presentation during playback.

So, it is for instance possible that an original English-language movie is to be published with optional French-spoken text and optional German spoken text. In that case, there is a first audio elementary stream containing the original English-spoken text, a second audio elementary stream containing the French-spoken text (translation 1), and a third audio elementary stream containing the German-spoken text (translation 2).

Also, it is for instance possible that a movie is to be published with English, French and German subtitles. In that case, there is a first graphics elementary stream containing the English text, a second graphics elementary stream containing the French text, and a third graphics elementary stream containing the German text.

The above applies already in the case of only one version of the moving pictures, i.e. video elementary stream. However, it is also possible that the information carrier contains two or more alternative versions of the moving pictures, where the same scene is viewed from different angles. This will be indicated as a multi-angle movie.

In theory, it would be possible to multiplex the plurality of alternative video elementary streams into the transport streams. During playback, the entire transport stream would be read, and only the selected video stream, audio stream and graphics stream would be decoded. However, in view of the fact that the bit rate associated with one video elementary stream is already quite high (more than 20 Mbps), this approach would result in very high bit rates, too high in relation to the read rate from the drive which is 54 Mbps for the BD-ROM drive.

According to the above-mentioned DVD-VIDEO standard, this problem is avoided by generating a plurality of individual alternative transport streams associated with the alternative video elementary streams, i.e. each of the plurality of alternative video elementary streams is combined with the same set of multiple audio elementary streams and graphics elementary streams; during playback, only the one transport stream associated with the desired viewing angle is read, and only the selected audio stream and graphics stream is decoded. Thus, the information relating to audio and graphics is recorded multiple times (as many times as the number of alternative video elementary streams). A disadvantage of this approach is that, in case the audio and graphics information is the same for all viewing angles, storage space is wasted.

In principle, it would be possible to store each alternative transport stream as one continuous recording, so that the different transport streams are physically recorded in different disc sections. This would be adequate, if a user could only make a choice at the beginning of the playback. However, in multi-angle video, a user is given the possibility to change from one viewing angle to any of the other viewing angles at any desired moment. This involves, during playback, a jump from the current reading location in the current transport stream to the corresponding reading location in the transport stream of the user's choice. The required jump distance would be large to such extent that a very large video buffer would be necessary to assure continuous display. Also, the time between the user entering his choice (e.g. pressing a button) and the system responding by changing the presentation from one viewing angle to the other viewing angle would be relatively long, to such extent that it is to be expected that the user, getting impatient, presses the button again.

In order to avoid these problems, the above-mentioned DVD-VIDEO standard provides for an interleaved recording of the different transport streams. More particularly, each transport stream is divided into relatively small transport stream pieces, indicated as angle blocks; the angle blocks of the different transport streams are interleaved in one stream. This is schematically illustrated in FIG. 1, which shows the contents of a portion of a track of a record carrier (optical disc), for an illustrative example where a movie is recorded in three different viewing angles. The record carrier contains three different information streams TS1, TS2, TS3.

Each information stream is divided into angle blocks AB1($i$), AB2($i$), AB3($i$), index i indicating the order of display. A combination of three angle blocks AB1($i$), AB2($i$), AB3($i$) is indicated as an interleaved unit IU(i). Each angle block ABj(i) (j=1-3) contains a multiplex of one video elementary stream VSj(i) and multiple audio and graphics elementary streams ASj,k(i) and GSj,m(i). In the example shown, k=1-2 and m=1-3. Within one interleaved unit IU(i), the three audio elementary streams ASj,k(i) of each angle block ABj(i) may be mutually different, and the three graphics elementary streams GSj,m(i) of each angle block ABj(i) may be mutually different.

Assume that a user is watching version 2 of the movie, and has selected the second audio stream AS2,2 and the third graphics stream GS2,3 associated with the second movie version. In respect of interleaved unit IU(i), a disc drive reads angle block AB2($i$); at the end of this angle block, the disc drive jumps to the beginning of the next angle block AB2(i+1) of the same transport stream TS2 in the next interleaved unit IU(i+1). Thus, the entire transport stream TS2 is read from disc; the corresponding video stream VS2, the selected audio stream AS2,2 and the selected graphics stream GS2,3 are decoded and displayed.

a] One disadvantage of this prior art recording method relates to the fact that each angle block must be read and displayed in its entire length. Changing viewing angles is only allowed at the borders of the angle blocks.

b] Another disadvantage of this prior art recording method relates to the fact that the length of the angle blocks is a trade-off between several conflicting requirements.

b.1] If the angle blocks are very short, their contents are insufficient to fill a display buffer with sufficient information to assure display during the entire jump, so seamless presentation may be jeopardized.

b.2] Further, during normal play, i.e. without changing angles, the disc drive must regularly make jumps from one angle block ABj(i) to the next angle block ABj(i+1) of the same transport stream TSj. Jumps are associated with noise, and reduce the reliability of the system, so it is desirable to reduce the jump frequency.

b.3] Furthermore, in the file system tables, each angle block constitutes an extent (i.e. disc region), and a large number of short extents increases the size of the file system tables.

The above aspects [b.1]-[b.3] illustrate that it is desirable to increase the length of the angle blocks. However, increasing the length of the angle blocks introduces other problems.

b.4] When the length of the angle blocks is increased, the jump distance also increases. During normal play, the regular jumps all have length $L_n=(N-1) \times L_b$, Lb representing the length of the angle blocks and N representing the number of angle blocks in an interleaved unit, i.e. the number of video streams. In the case of changing a viewing angle, the jump has a maximum length $L_m=2(N-1) \times L_b$. The jumps take time, and the longer the jump, the longer it takes. During a jump, the disc is not read, and display is provided by reading data from a data buffer. For longer jumps, larger data buffers are required.

b.5] Further, when the length of the angle blocks is increased, the reaction time also increases. With reaction time, the time is meant between a user pressing a selection button and the system starting to display the new angle. After the moment in time when the user presses the button, the disc drive must continue reading the current angle block, and must execute the long jump, before reading, decoding and display at the new angle can begin.

It is an important objective of the present invention to overcome or at least reduce at least one of said disadvantages.

SUMMARY OF THE INVENTION

According to an important aspect of the present invention, changing angles is allowed at predefined locations within the angle blocks. These predefined locations may be indicated in a table stored in a memory of a disc drive, or in a table stored in a predefined storage location of the disc, or in a table stored in a header of the movie.

As a result, the length of the angle blocks can more easily be selected longer to overcome the problems b.1], b.2] and b.3] mentioned earlier, without introducing the problem b.5].

For jumps having a radial jump distance not more than 100 µm, the jump time is substantially equal. Thus, when the length of the angle blocks is increased to a value chosen such that, in conjunction with the number of angle blocks per unit, the radial jump distance is not more than 100 μm, problem b.4] does not become worse. If the combination of angle block length and number of angle blocks per unit leads to a radial jump distance of more than 100 μm, an optimisation is preferred wherein the number of jumps is as few as possible.

BRIEF DESCRIPTION OF THE DRAWINGS

These and other aspects, features and advantages of the present invention will be further explained by the following description with reference to the drawings, in which same reference numerals indicate same or similar parts, and in which:

FIG. 6A is a timing diagram schematically illustrating the positioning of an optical head as a function of time during a change of viewing angle;

DESCRIPTION OF THE INVENTION

Figure 2:
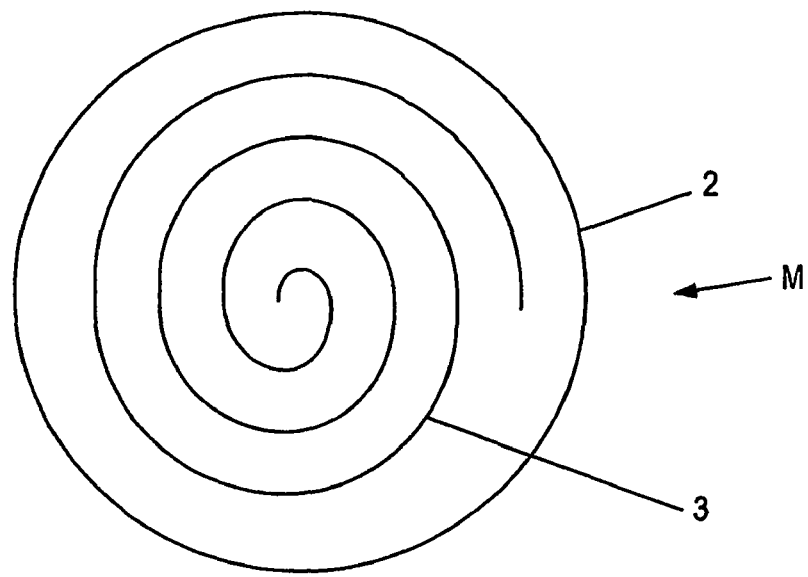
FIG. 2 schematically shows an optical disc.

FIG. 2 schematically illustrates an optical disc 2, more specifically a BD disc, as a preferred example of a record carrier to which the present invention relates. The disc 2 has a track 3, which is shown as one continuous spiral-shaped track but which alternatively may consist of a plurality of mutually concentric circular track portions. The track 3 contains a recording of a multi-angle movie M with, in this example, three alternative versions VS1, VS2, VS3 of the moving pictures, three versions GS1, GS2, GS3 of the graphics pictures, and two versions AS1, AS2 of the audio signals.

Figure 3:
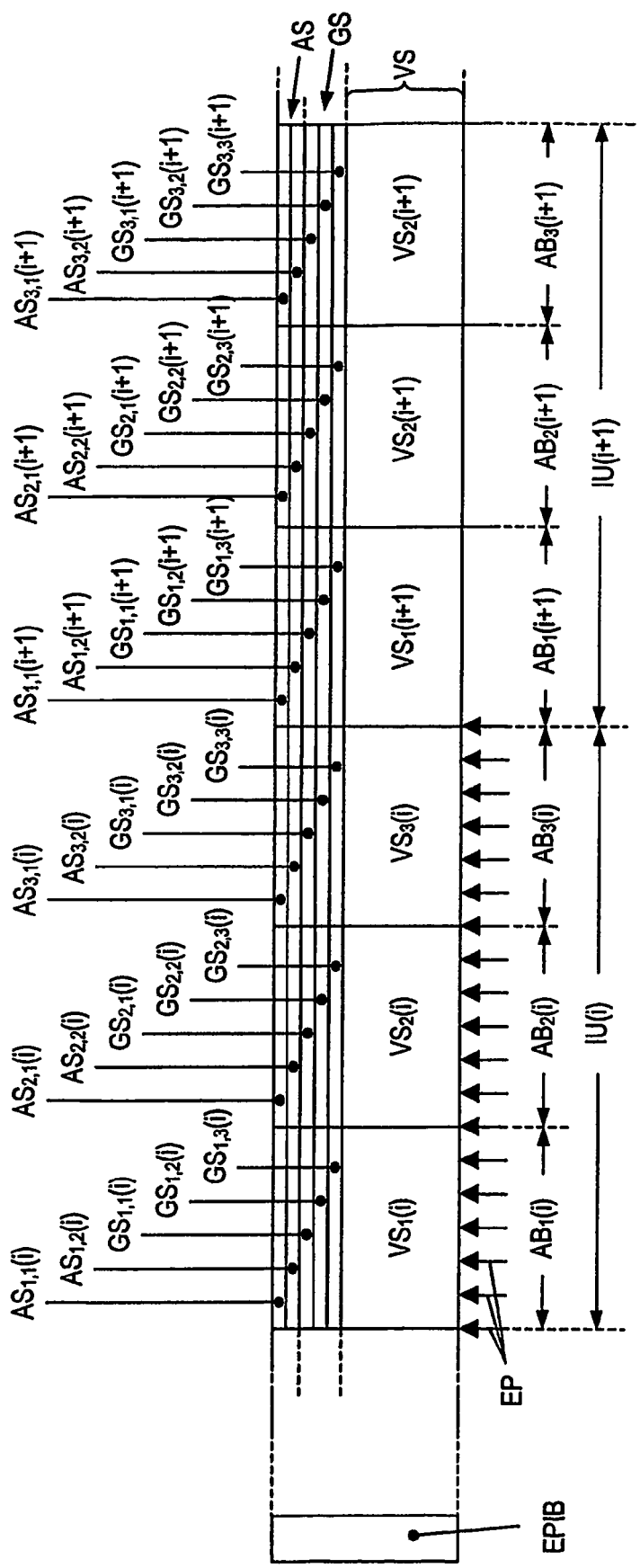
FIG. 3 schematically illustrates a portion of a track of a record carrier to illustrate interleaved recording of multi-angle information according to a preferred embodiment of the present invention.

FIG. 3 is a diagram schematically illustrating a part of the track 3. In this example, the three alternative versions VS1, VS2, VS3 of the moving pictures, the three versions GS1, GS2, GS3 of the graphics pictures and the two versions AS1, AS2 of the audio signals are recorded as a multiplexed video/audio/graphics stream. The multi-angle movie stream is divided into a plurality of interleaved units IU with mutually the same presentation interval. Each interleaved unit IU(i) corresponds to a predetermined amount of playtime. Each interleaved unit IU(i) comprises:
    a first angle block AB1($i$) having a length corresponding to said predetermined amount of playtime,
    a second angle block AB2($i$) having a length corresponding to said predetermined amount of playtime,
    a third angle block AB3($i$) having a length corresponding to said predetermined amount of playtime.

Each angle block ABj(i) comprises:
    a portion ASj,1($i$) of first audio elementary stream AS1, this portion having a length corresponding to said predetermined amount of playtime,
    a portion ASj,2($i$) of second audio elementary stream AS2, this portion having a length corresponding to said predetermined amount of playtime,
    a portion GSj,1($i$) of first graphics elementary stream GS1, this portion having a length corresponding to said predetermined amount of playtime,
    a portion GSj,2($i$) of second graphics elementary stream GS2, this portion having a length corresponding to said predetermined amount of playtime,
    a portion GSj,3($i$) of third graphics elementary stream GS3, this portion having a length corresponding to said predetermined amount of playtime,
    one portion VSj(i) of j-th angle video elementary stream VSj, this portion having a length corresponding to said predetermined amount of playtime.

Figure 1:
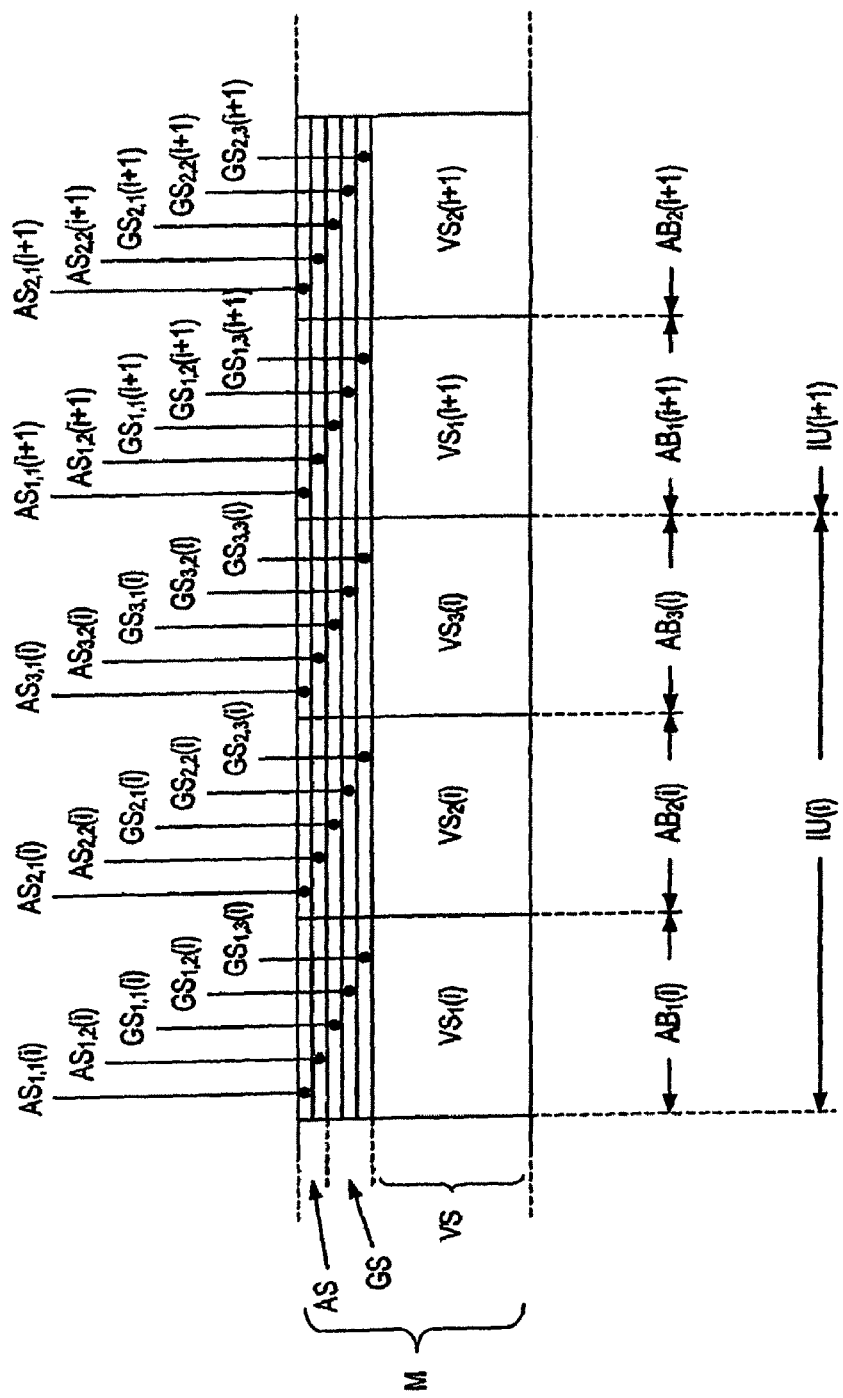
FIG. 1 schematically illustrates a portion of a track of a record carrier to illustrate interleaved recording of multi-angle information according to the state of the art.

In the example of FIG. 3, the present invention is implemented with a recording structure according to the state of the art, i.e. wherein each video portion VSj(i) of an angle block ABj(i) is multiplexed with all audio portions ASj,1($i$), ASj,2($i$) of that angle block ABj(i) and with all graphics portions GSj,1($i$), GSj,2($i$), GSj,3($i$) of that angle block ABj(i), to obtain angle blocks as illustrated in FIG. 1. In such case, reading and decoding of angle blocks is done in a similar way as explained with respect to FIG. 1. Alternatively, the audio portions, the graphics portions and the video portions may also be recorded as separate blocks; in such case, an audio block and a graphics block will be read first and then a video block will be read. However, although such is preferred, it is not essential for implementing the present invention.

On the other hand, the present invention is not restricted to an information stream comprising audio and/or graphics as well as video. In general, the present invention relates to an information stream which at least contains a plurality of alternative parts of one type, specifically video. By way of example, the present invention would be applicable in the case of a silent movie without graphics.

Figure 4:
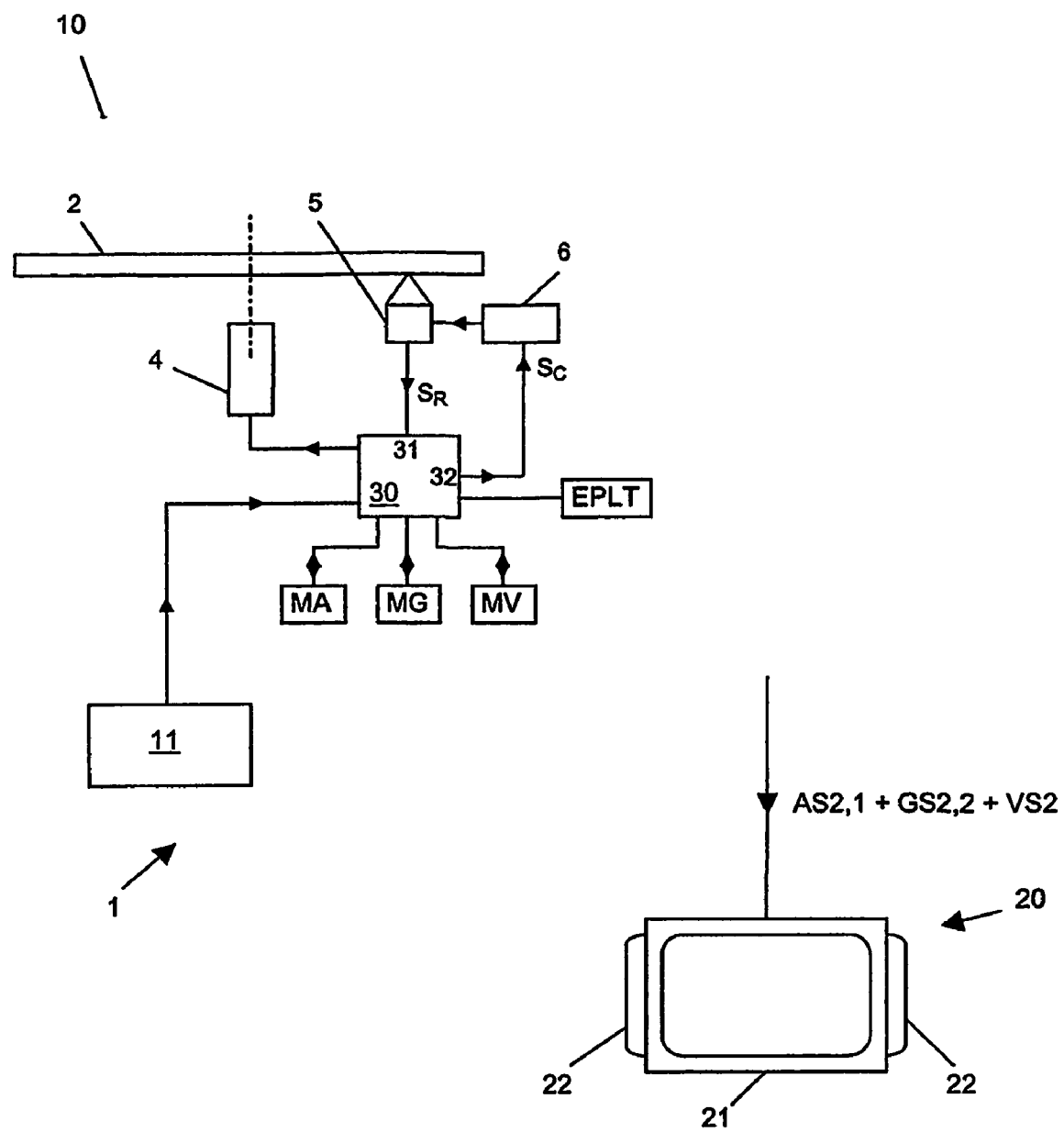
FIG. 4 is a block diagram schematically illustrating an embodiment of an audio/video reproduction system.

FIG. 4 is a block diagram schematically illustrating an embodiment of an audio/video reproduction system 1. The audio/video reproduction system 1 comprises a disc drive 10 and a display device 20, which comprises at least one screen 21 for displaying images and at least one loudspeaker 22 for generating sound. The disc drive 10 is capable of reading information from the disc 2, which disc contains information recorded in accordance with the invention.

The disc drive 10 comprises a disc motor 4 for rotating the disc 2, and an optical head 5 for scanning the track 3 of the rotating disc 2. An actuator device 6 sets the correct positioning of the optical head 5. A controller 30 controls the disc motor 4 and the actuator device 6. The controller 30 has a first input 31 receiving an optical read signal SR from the optical head 5. The controller 30 is designed to generate a control signal SC at a first output 32 for controlling the positioning of the optical head 5.

The controller 30 is provided with an audio buffer memory MA, a graphics buffer memory MG, and a video buffer memory MV. The controller 30 is further provided with a user control panel 11, which comprises user-controllable input means, such as keys, switches, knobs, and the like, allowing a user to enter a selection or a command to the controller 30; since such input means are known per se, they are not shown separately in FIG. 4.

In the state of the art, as explained earlier, it is necessary to always read and display an entire (multiplexed) angle block before a jump to another viewing angle can be made. According to the present invention, this restriction is avoided. Within the angle blocks, whether containing video multiplexed with the audio and/or graphics or not, entry points are predefined, which entry points are indicated as vertical arrows in EP in FIG. 3. These entry points are locations where it is possible to start reading and decoding information without needing information from previous locations. Hence, each entry point coincides with the beginning of a GOP (Group of Pictures). Preferably, each beginning of a GOP coincides with an entry point, but this is not essential. In the drawing, it is assumed that each video block contains six entry points, but this is just an illustrative example. Further, in the drawing, the entry points are equidistant, which is preferred but not essential.

The entry points EP may be stored in an entry point locations table EPLT in a memory of the disc drive 10. The entry points in this table contain the locations in the information streams of each angle for the same instant (time stamp). However, the entry points EP may also be written in special entry point information blocks EPIB of the video streams VS. With each interleaved unit IU, a corresponding entry point information block EPIB is associated. This entry point information block EPIB may be written once in the interleaved unit IU, at a predefined position; in that case, a jump to this predefined position is always necessary on reading, irrespective of the selection of the viewing angle. On the other hand, it is also possible that the entry point information block EPIB is written multiple times, i.e. at the beginning of each individual video block AB1, AB2, AB3 in the interleaved unit IU.

In FIG. 3, one entry point information block EPIB is shown at the beginning of the movie M. When beginning to read a movie M from disc, the disc drive 10 will first read the entry point information block EPIB and store the information in its entry point locations table EPLT, which table will be consulted during the playback of the movie M.

Thus, in the following, it will be assumed that the locations of the entry points EP are stored in the entry point locations table EPLT in said memory of the disc drive 10.

In the following, the operation of the disc drive 10 during normal play will be explained with reference to FIG. 5A, which is comparable with FIG. 3 and illustrates the positioning of the optical head 5 as a function of time t (vertical axis), and with reference to FIG. 5B, which is a timing diagram illustrating the timing of the actions of the apparatus 1.

Assume that a user has made a selection to view the multi-angle movie M with the second viewing angle, the first audio stream and the second graphics stream.

Assume that playback has reached interleaved unit IU(i). More particularly, at time t1, the optical head 5 reaches the second angle block AB2(i), and the controller 30 controls the optical head 5 to read the information from disc. From the information read, the first audio elementary stream portion AS2,1(i) of this second angle block AB2(i) is decoded and its contents is stored in the audio buffer MA. Likewise, the second graphics elementary stream portion GS2,2(i) of this second angle block AB2(i) is decoded and its contents is stored in the graphics buffer MG. Likewise, the second angle video elementary stream portion VS2(i) is decoded and its contents is stored in the video buffer MV.

As soon as, at time t6, the amount of data in the video buffer MV corresponds to at least one picture, display can start. The controller 30 reads the video information from video buffer MV, the graphics information from graphics buffer MG, and the audio information from audio buffer MA, and provides corresponding image and sound signals to the display device 20.

In the interval from t5 to t7, the buffer memories MA, MG and MV are kept full by reading data from AB2.

When, at time t7, the optical head 5 has reached the end of second angle block AB2(i), the controller 30 controls the optical head to jump to the start location of the second angle block AB2(i+1) of the next interleaved unit IU(i+1), and at time t8 the above-described process is repeated for the next interleaved unit IU(i+1): second angle block AB2(i+1) is read, first audio elementary stream AS2,1(i+1) of this second angle block AB2(i+1) is decoded and its contents is stored in the audio buffer MA, second graphics elementary stream GS2,2(i+1) of this second angle block AB2(i+1) is decoded and its contents is stored in the graphics buffer MG, and second angle video elementary stream VS2(i+1) is decoded and its contents is stored in the video buffer MV. In the time interval t7(i)-t6'(i+1) required for jumping to the start location of the next block AB2(i+1) and reading the first picture of the second angle video elementary stream VS2(i+1), display is continued by reading information from the buffers MA, MG, MV.

It should be clear to a person skilled in the art that the above steps are continued for the duration of the movie.

In the following, the operation of the disc drive 10 for the situation that the user wishes to change viewing angle will be explained with reference to FIGS. 6A-B, which are comparable to FIGS. 5A-B, respectively.

Until some time tx during the time interval t1-t7 of interleaved unit IU(i), the operation is as described in the above. Assume that, at time tx, the user gives a command to change viewing angle, more particularly a command to change to the third video stream VS3. Reading of second angle block AB2(i) continues until the next entry point EPx, which is reached at t11. At that moment, the controller 30 controls the optical head 5 to jump to the corresponding entry point EPx of the third angle block AB3(i) of the same interleaved unit IU(i), and at time t12, reading is resumed as from this entry point EPx of the third angle block AB3(i): third angle block AB3(i) is read, first audio elementary stream AS3,1(i) of this third angle block AB3(i) is decoded and its contents is stored in the audio buffer MA, second graphics elementary stream GS3,2(i) of this third angle block AB3(i) is decoded and its contents is stored in the graphics buffer MG, and third angle video elementary stream VS3(i) is decoded and its contents is stored in the video buffer MV.

As soon as, at time t13, the data of the second angle video elementary stream block VS2(i) in the video buffer MV has been fully displayed, display of the third video elementary stream block VS3(i) and second graphics elementary stream GS3,2(i) starts, and presentation of first audio elementary stream AS3,1(i) starts.

Operation continues as described above until time t14, when the optical head 5 reaches the end of third angle block AB3(i). Then, the controller 30 controls the optical head 5 to jump to the start location of the third angle block AB3(i+1) of the next interleaved unit IU(i+1), and at time t15 reading of this third angle block AB3(i+1) starts.

It is noted that the reaction time of the system is now equal to the time interval from the time tx of the user command till the time t13 of the start of display of the third video stream VS3.

In this respect it is noted that, during the period from t1 to t14, the amount of information in the video buffer MV may be kept relatively small, i.e. corresponding to only a few GOPs (one or two). Reading from optical disc can be done at a bit rate of 54 Mbps, while reading information from the video buffer (leak rate) can for instance be done at a bit rate of 20 Mbps, so the disc drive is alternatingly reading and waiting. The number of GOPs in the video buffer MV is sufficient to support display during the jump (t11-t12) within the interleaved unit IU; after the jump, the video buffer is filled with video information read from the new angle block.

Figure 6B:
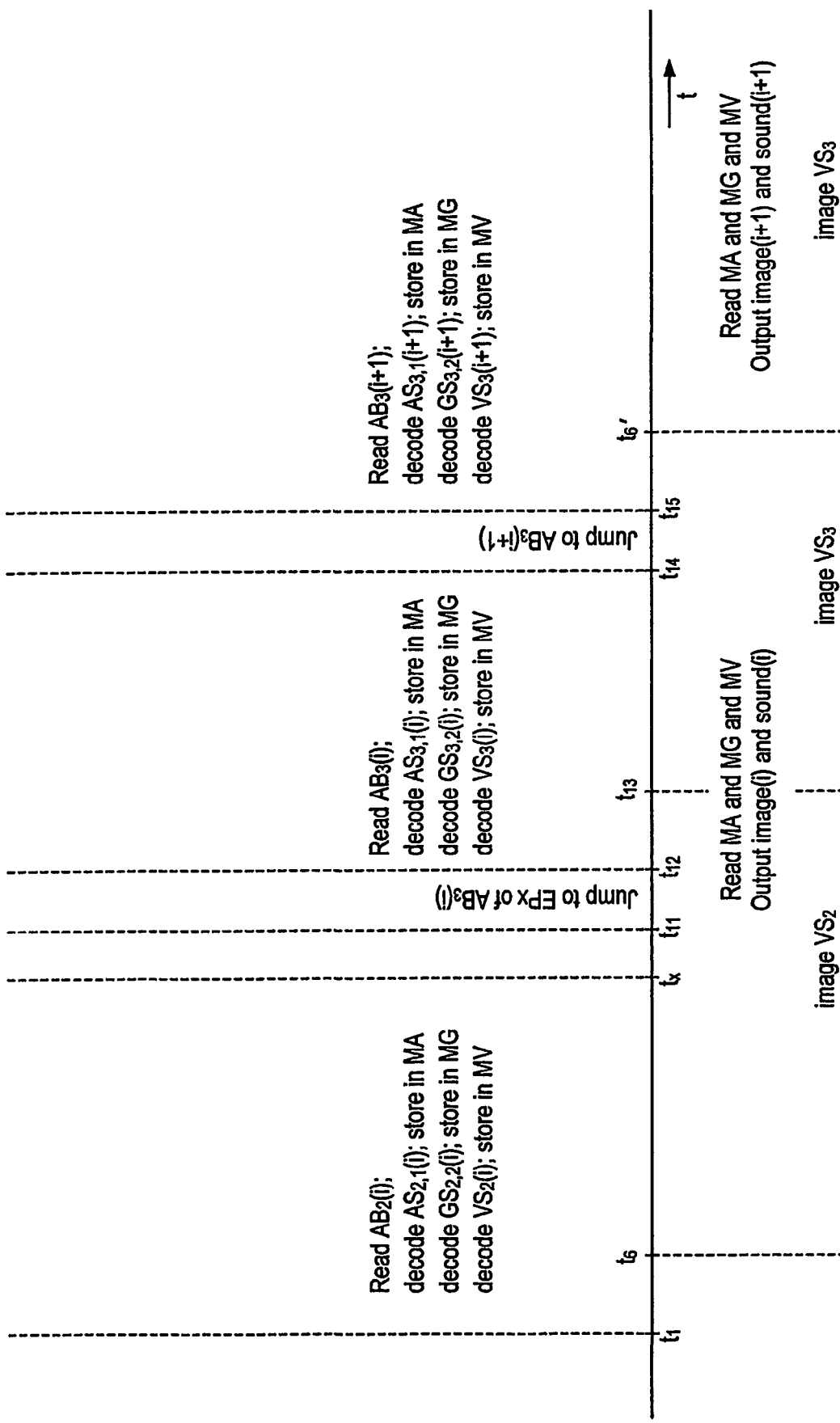
FIG. 6B is a timing diagram schematically illustrating the timing of actions of a disc drive apparatus during a change of viewing angle.
Figure 6C:
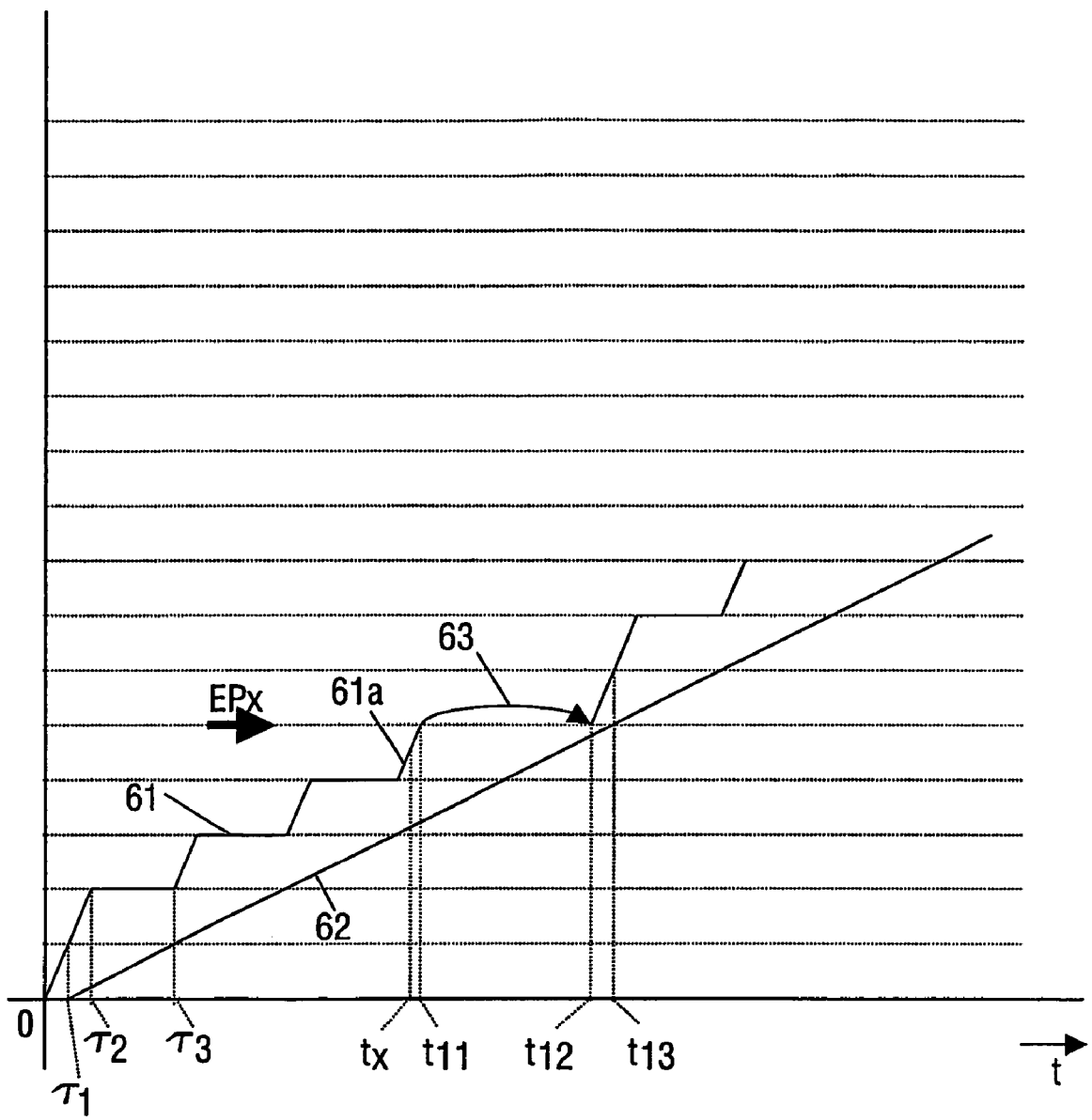
FIGS. 6C and 6D are timing diagrams, illustrating two different modes of operation.

This mode of operation is illustrated in FIG. 6C. The horizontal axis represents time, the vertical axis represents the video information; each vertical unit represents a GOP. Curve 61 represents the information being read from disc and stored into video buffer MV, while curve 62 represents the information being read from video buffer MV. Reading from disc starts at time τ=0. At time τ1, one GOP has been written into the video buffer MV, and reading this GOP from video buffer MV, decoding, and displaying can start. Reading from disc continues, until at time τ2 a second GOP has been read. Now the disc drive is idle, until time τ3, when the first GOP has been read from video buffer MV: then, reading from disc is resumed.

Assume that, at time tx, the change command is received when the disc drive is reading from disc (line 61a). As mentioned before, reading is continued until time t11, when the first next entry point (start of a new GOP) is reached, indicated as EPx. Then, a jump (indicated as curve 63) is made until time t12, and, in the new angle block, reading starts at the same entry point EPx. As soon as one GOP of the new video block has been read, display at the new viewing angle starts at t13.

It is noted that, when at time tx the disc drive is idle, the jump can be made immediately, without it being necessary to wait until a next entry point.

Figure 6D:
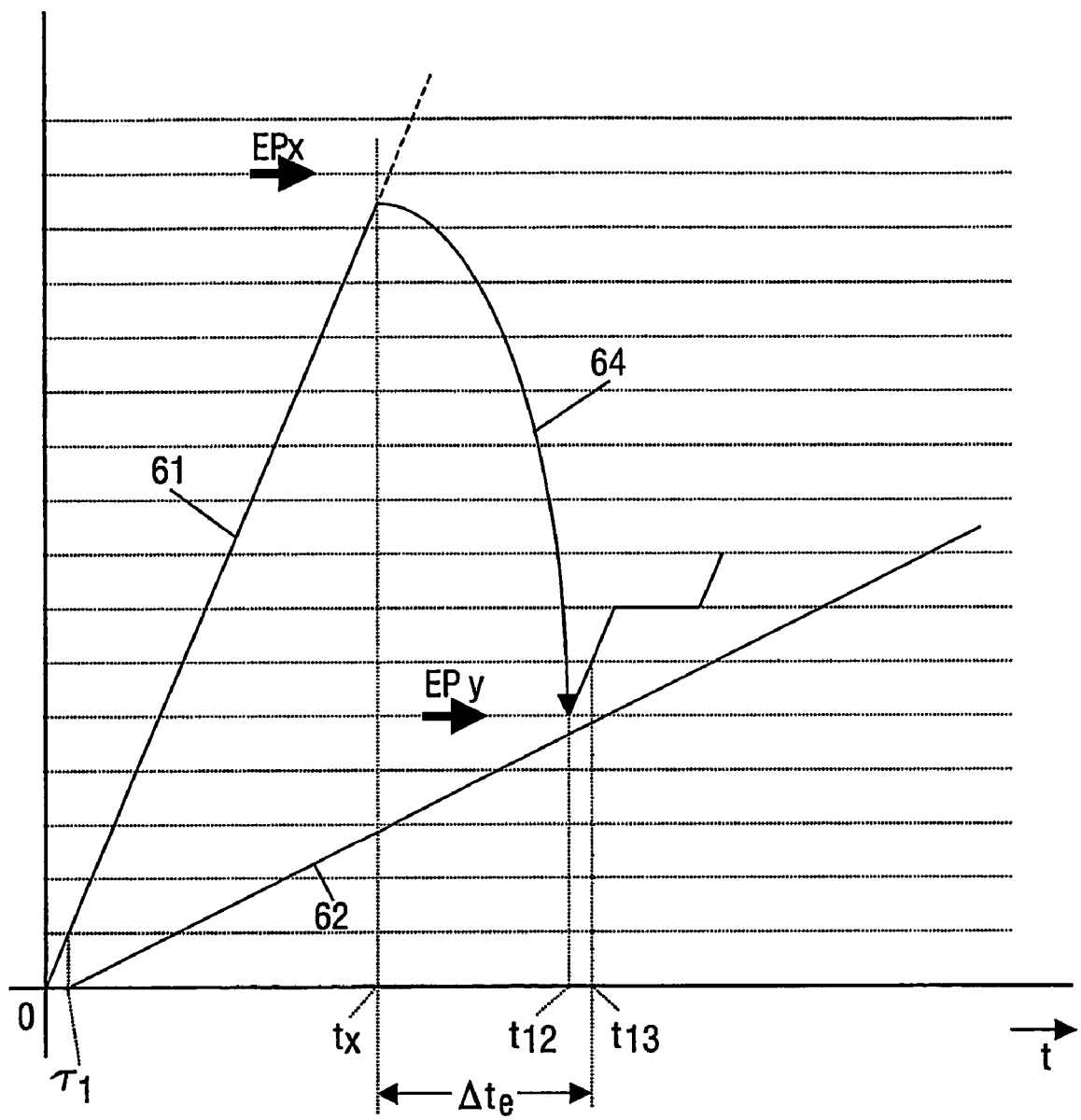

It is also possible that reading from optical disc is done such that the amount of information in the video buffer MV corresponds to a relatively large number of GOPs. In that case, when a user enters a change command, the number of GOPs in the video buffer MV is more than necessary for supporting display during the jump (t11-t12) within the interleaved unit IU. This mode of operation is illustrated in FIG. 6D, comparable to FIG. 6C.

In this case, reading is done continuously, so that the amount of information in the video buffer continuously increases. Thus, at time tx, the number of GOPs in the video buffer is more than enough for supporting display during a jump. Although the disc drive is in the process of reading from disc at time tx, it is not necessary to continue until the first next entry point (start of a new GOP) is reached, indicated as EPx. Instead, a jump can be performed immediately, indicated at curve 64.

First, it is calculated (estimated) how long it will take until the jump is completed and one GOP has been read; this estimated jump time is indicated as $\Delta t_e$. Then, it is calculated which is the first next entry point to be reached by display (curve 62) after time tx+$\Delta t_e$; this entry point is indicated as EPy in FIG. 6D. Then, a jump is made to said entry point EPy in the new video block, which is reached at time t12, and reading starts. As soon as one GOP of the new video block has been read at t13, display at the new viewing angle can start (or, as illustrated, somewhat later, when the previous GOP has been completely read from video buffer MV). The remaining data in the buffer from the previous angle is removed without displaying.

Figure 7:
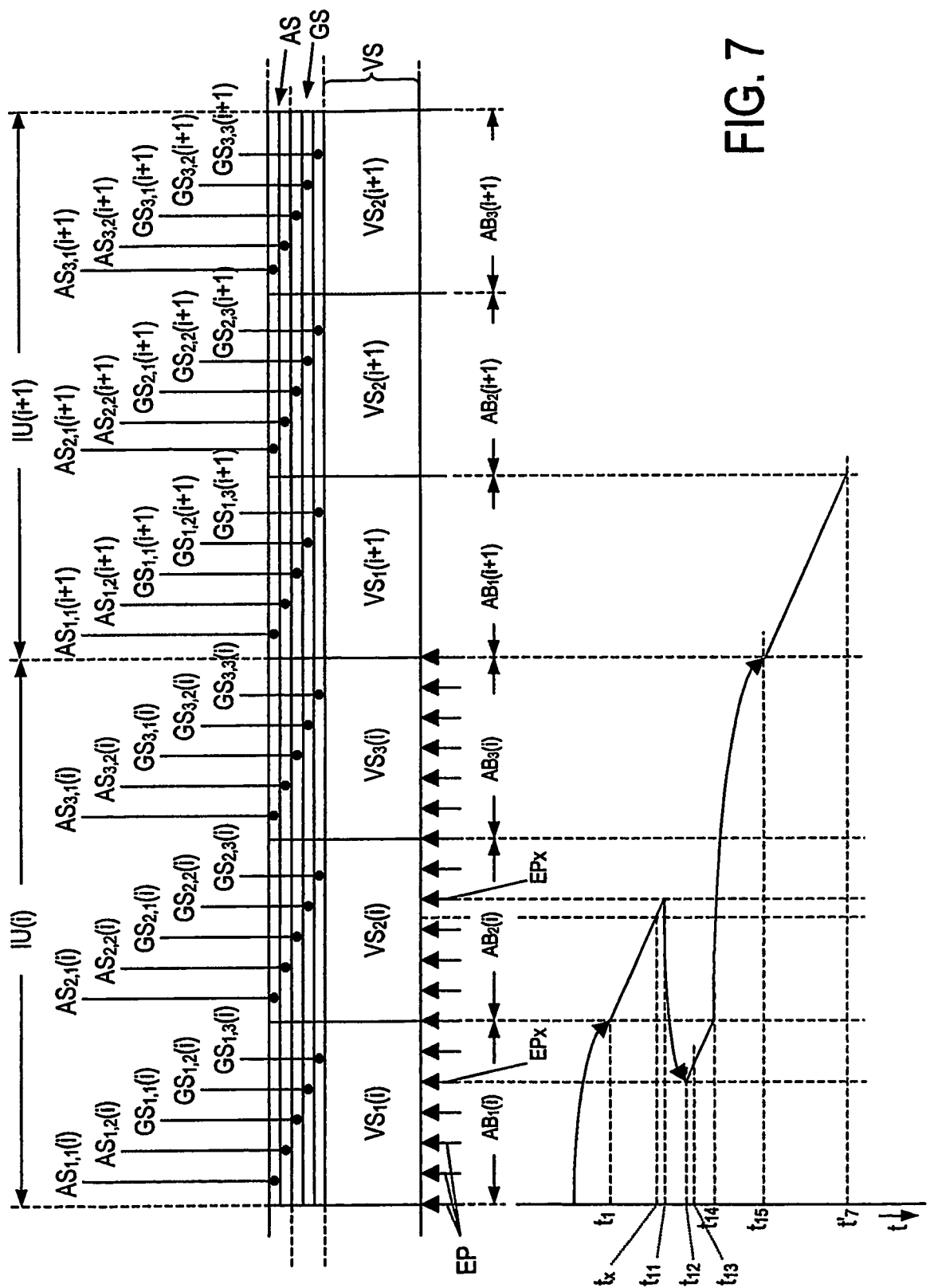
FIG. 7 is a timing diagram schematically illustrating the positioning of an optical head as a function of time according to the present invention during a change of viewing angle.

FIG. 7 is a drawing comparable to FIG. 6A, for an alternative case where, at time tx, the user gives a command to change to the first video stream VS1. In this case, at time t11, the controller 30 controls the optical head 5 to jump to the corresponding entry point EPx of the first angle block AB1(i) of the same interleaved unit IU(i), and at time t12, reading is resumed as from this entry point EPx of the first angle block AB1(i); decoding and display of the first angle video elementary stream block VS1(i) starts at time t13. At time t14, when the optical head 5 reaches the end of first angle block AB1(i), the controller 30 controls the optical head 5 to jump to the start location of the first angle block AB1(i+1) of the next interleaved unit IU(i+1), and at time t15 reading of this first angle block AB1(i+1) starts.

Figure 5A:
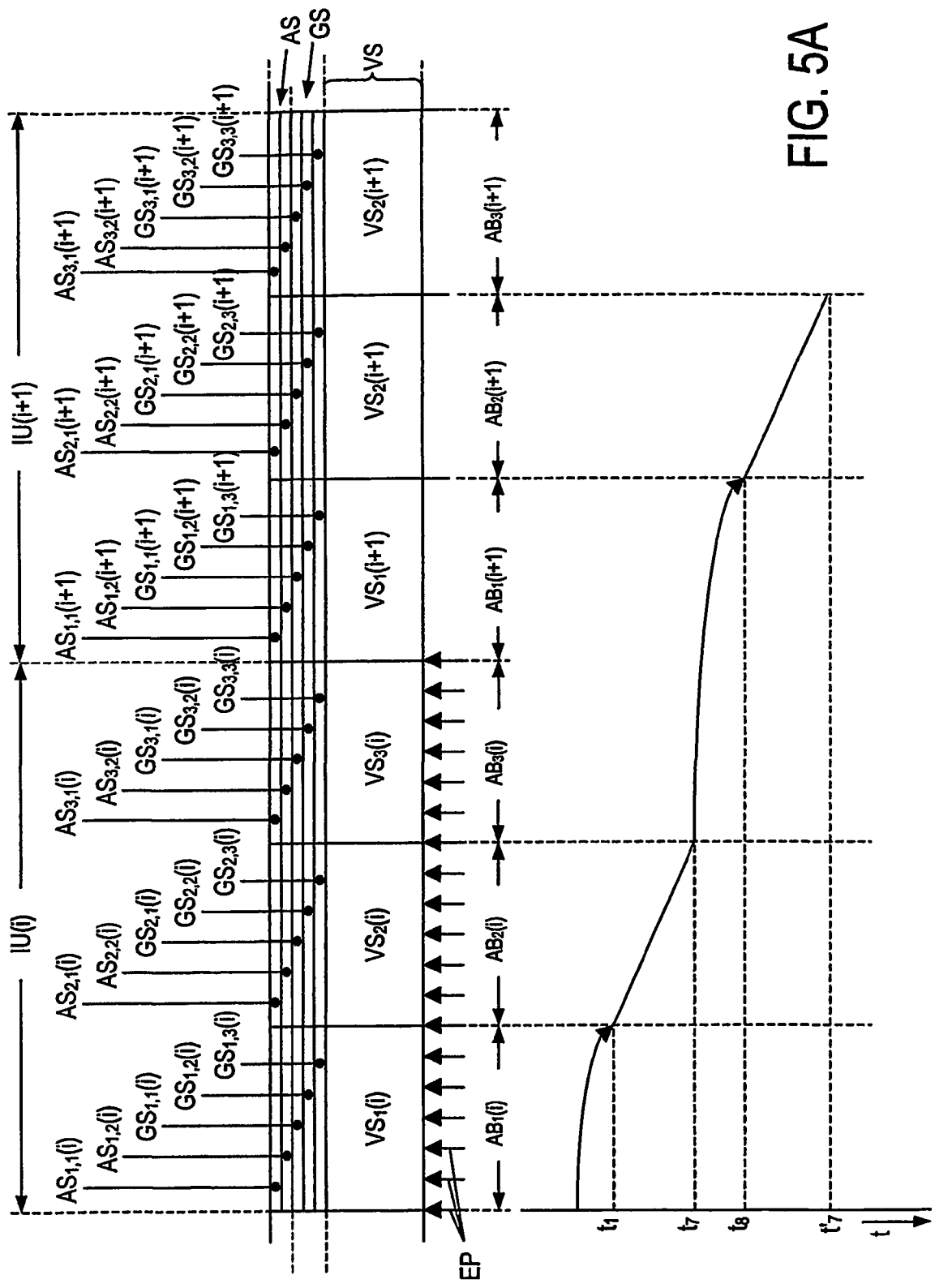
FIG. 5A is a timing diagram schematically illustrating the positioning of an optical head as a function of time during normal play.
Figure 5B:
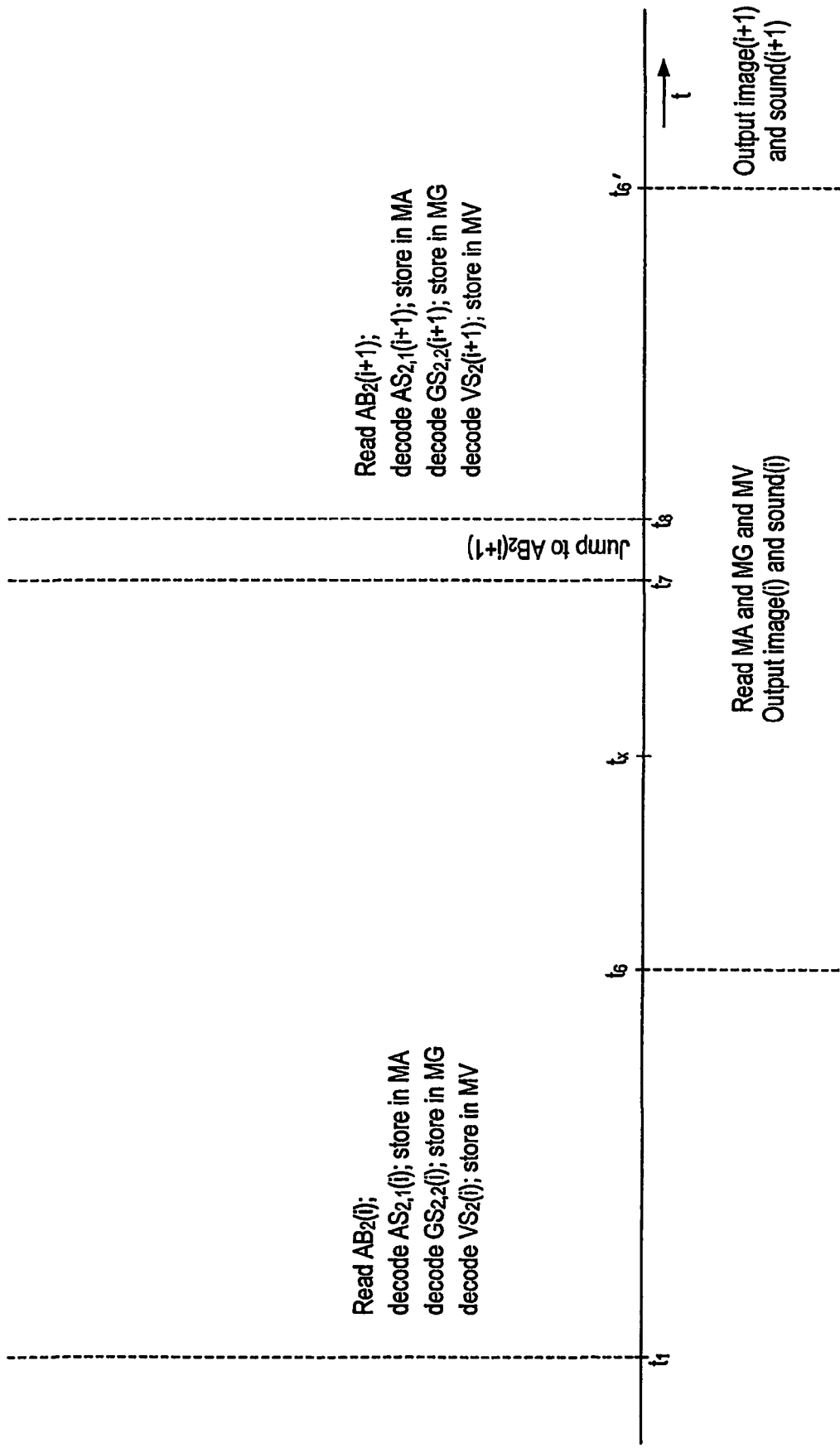
FIG. 5B is a timing diagram schematically illustrating the timing of actions of a disc drive apparatus during normal play.

With reference to FIG. 5A, it is noted that, during normal play, playing of an interleaved unit IU(i) always involves one jump from t7 to t8. With reference to FIGS. 6A and 7, in case of a change in viewing angle, playing of an interleaved unit IU(i) always involves two jumps, i.e. the same jump as mentioned plus an additional jump from t14 to t15. An important advantage is that the waiting time between the user entering his command (tx) and the system reacting by displaying the new viewing angle is now greatly reduced: this waiting time is now determined by the time to reach the next entry point, to jump to the corresponding entry point in the target angle block of the same interleaved unit, and to read the first video image. This makes it possible to substantially increase the length of the angle blocks, thus reducing the number of extents while also increasing the presentation duration (t6-t6') of one interleaved unit. Since, in normal play, no jumps are needed as long as an angle block is being read, increasing the presentation duration (t6-t6') of one interleaved unit implies increasing the duration of presentation time between jumps.

When designing the disc drive 10, the size of the buffers MA, MG, MV should be selected to accommodate the longest jump times to be expected, in relation to block size, bit rate, etc. Or, conversely, when designing the recording/playback system, the size of the blocks should be selected in relation to the maximum buffer size, the bite rate, etc. Also, the size of the angle blocks may be increased to any desired length, but it is preferred to select this size, in combination with the number of video streams, such that, during normal play, jumps are always possible by controlling the optical lens without needing to displace the sledge, because such would generate more noise and consume more power.

In the following, a numerical example will be given.

Assume that a maximum jumping distance without sledge displacement is about 100 μm. Assuming further a track pitch of about 330 nm, and 2.5 ECC blocks per track at inner radius, the maximum jump distance equals 750 ECC blocks (24000 logical blocks). To introduce a safety margin, a maximum jump distance of 600 ECC blocks (19200 logical blocks) is considered; the corresponding jump time required is about 150 ms.

During normal play, the maximum jump distance corresponds to (m−1) angle blocks, m representing the number of video streams. Thus, the size of each angle block can be 600/(m−1) ECC blocks. The (jump-free) presentation duration of such block depends on the leak rate, i.e. the bit rate at which the video memory is read. The following table shows the presentation duration of an angle block for several combinations of leak rate and m. Here, the leak rate is the rate from the stream which contains the multiplexed elementary streams in an angle block.

| Leak rate (Mbps) | Number of angles | | | | | | | |
|---|---|---|---|---|---|---|---|---|
| | 2 | 3 | 4 | 5 | 6 | 7 | 8 | 9 |
| 16 | 19.7 | 9.8 | 6.6 | 4.9 | 3.9 | 3.3 | 2.8 | 2.5 |
| 20 | 15.7 | 7.9 | 5.2 | 3.9 | 3.1 | 2.6 | 2.2 | 2.0 |
| 24 | 13.1 | 6.6 | 4.4 | 3.3 | 2.6 | 2.2 | 1.9 | 1.6 |
| 28 | 11.2 | 5.6 | 3.7 | 2.8 | 2.2 | 1.9 | 1.6 | 1.4 |
| 32 | 9.8 | 4.9 | 3.3 | 2.5 | 2.0 | 1.6 | 1.4 | 1.2 |
| 36 | 8.7 | 4.4 | 2.9 | 2.2 | 1.7 | 1.5 | 1.2 | 1.1 |
| 40 | 7.9 | 3.9 | 2.6 | 2.0 | 1.6 | 1.3 | 1.1 | 1.0 |
| 44 | 7.1 | 3.6 | 2.4 | 1.8 | 1.4 | 1.2 | 1.0 | 0.9 |
| 48 | 6.6 | 3.3 | 2.2 | 1.6 | 1.3 | 1.1 | 0.9 | 0.8 |

In the case of the combinations indicated within the thick line, the jump distance is small, i.e. less than 600 ECC blocks.

These combinations are most important: in multi-angle systems the number of angels is often limited to 2 or 3 and the bit rate is also limited because the playing time should be kept.

So for the most important situations it is possible to realise the jump distance without moving the sledge and still limiting the number of jumps per second.

In the case of the other combinations, it is preferred to have larger angle blocks. It is true that such would involve displacement of the sledge during a jump, but the presentation time between jumps can be increased substantially.

When the viewing angle is changed, the maximum jumping distance is 2(m−1) angle blocks (from AB1(i) to ABm(i+1). Assume that this maximum jumping distance is about 25000 ECC blocks; the corresponding jumping time will be about 450 msec. During normal play, jumps will be about 12500 blocks long; for sake of simplicity, it is assumed that the corresponding jumping time is also about 450 msec.

The following table shows the presentation duration (in seconds) for several combinations of leak rate and m. It can be seen that a presentation duration (t6-t6') of more than one minute is clearly feasible.

| Leak rate | Number of angles | | | | | | | |
|---|---|---|---|---|---|---|---|---|
| | 2 | 3 | 4 | 5 | 6 | 7 | 8 | 9 |
| 16 | | | | 102.4 | 81.9 | 68.3 | 58.5 | 51.2 |
| 20 | | | | 81.9 | 65.5 | 54.6 | 46.8 | 41.0 |
| 24 | | | 91.0 | 68.3 | 54.6 | 45.5 | 39.0 | 34.1 |
| 28 | | | 78.0 | 58.5 | 46.8 | 39.0 | 33.4 | 29.3 |
| 32 | | 102.4 | 68.3 | 51.2 | 41.0 | 34.1 | 29.3 | 25.6 |
| 36 | | 91.0 | 60.7 | 45.5 | 36.4 | 30.3 | 26.0 | 22.8 |
| 40 | | 81.9 | 54.6 | 41.0 | 32.8 | 27.3 | 23.4 | 20.5 |
| 44 | | 74.5 | 49.6 | 37.2 | 29.8 | 24.8 | 21.3 | 18.6 |
| 48 | | 68.3 | 45.5 | 34.1 | | | | |

With respect to the size of the buffer memories, the following example is given for the case of 4 video streams and a leak rate of 24 Mbps and a maximum jump time of 450 msec.

The contents of the buffer just before the jump should be (0.45 sec×3 MB/sec) 1.35 MByte. Now there is no buffer underflow at the end of the jump. Suppose that the disc is read with a rate of 54 Mbps; then, it takes 0.36 sec to fill this buffer (1.35 MB/(6.75−3)MB/s). A continuous data flow is possible if the jumps are separated by 0.81 sec. If the duration of a GOP is 0.5 seconds, then the minimum distance between entry points is 0.5 seconds. At least two GOPs should be presented between angle changes.

It is noted that, after a jump to a location in an angle block, the contents of the video buffer memory has been used to a large extent for continuing display during the jump. Then, reading will start, and the contents of the video buffer memory will increase. If a new jump is performed too early, it may be that the content of the video buffer memory is too low to provide display during the jump. Thus, it is advisable to prevent jumping too soon after the termination of a previous jump.

It is possible that a jump is inhibited on the basis of time. In such case, a timer having a predetermined duration is started when a jump has terminated. If an angle change command is received before timeout of the timer, the controller waits until the timer duration is over, and a corresponding jump is performed at the first entry point after that moment.

It is also possible that a jump is inhibited on the basis of number of GOPs. For instance, it may be that the drive reads 2 GOPs before a new jump is allowed. In such case, a counter is started when a jump has terminated. The counter value is increased (or decreased) at the reading of each following GOP. If an angle change command is received, the controller checks the counter; a jump is allowed if, or delayed until, the counter has reached a predetermined value.

The above implies that not all GOPs may correspond to an entry point. In the above example, during normal play, reading always starts at the beginning of the first GOP, so the beginning of the second GOP may not be an entry point. On the other hand, the beginning of the last GOP may not be an entry point, because a jump has to be performed anyway at the end of said last GOP.

It should be clear to a person skilled in the art that the present invention is not limited to the exemplary embodiments discussed above, but that several variations and modifications are possible within the protective scope of the invention as defined in the appending claims.

For instance, the present invention is not limited to a movie having three alternative video streams, two alternative audio streams and three alternative graphics streams. For instance, a movie may be free from graphics and/or audio, or contain only one audio stream and/or video stream. On the other hand, a movie may contain more than three audio streams and/or video streams.

Further, in the above, the present invention has been explained for a case where the number of alternative audio streams is always equal for each of the three alternative video streams, and where the number of alternative graphics streams is always equal for each of the three alternative video streams, however, this is not essential.

Further, although the present invention has been explained for a situation where the audio and graphics streams are multiplexed with the video streams, this is not essential. Audio blocks, graphics blocks and video blocks may be written separately on disc, in which case further jumps are required to blocks of the selected audio, graphics and video streams, as should be clear to a person skilled in the art.

Further, in the above, the present invention has been explained for a case where decoding takes place before storing in memory. It is also possible that the data is stored in encoded form, while decoding takes place just before presentation: for the invention this is not relevant. Further, the buffer memories MA, MG and MV may be present in one stream buffer memory, but this is also not relevant for this invention.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, etc.

The invention claimed is:

1. Method for reading a record medium, the method comprising acts of:
    selecting one of a plurality of alternative information streams recorded on the record medium in an interleaved manner, wherein a track of the record medium contains a succession of consecutive interleaved units, each interleaved unit comprising one corresponding portion of each one of the plurality of alternative information streams; and wherein each one of the plurality of alternative information stream portions has a plurality of entry points within a given interleaved unit;
    reading the alternative information stream portion of the selected one of the plurality of alternative information streams associated with one interleaved unit;
    storing the alternative information stream portion of the selected one of the plurality of alternative information streams read into a buffer memory;
    outputting the alternative information stream portion of the selected one of the plurality of alternative information streams from the buffer memory;
    receiving a command to change to an other one of the plurality of alternative information streams;
    determining a next entry point of the alternative information stream portion of the selected one of the plurality of alternative information streams;
    continuing to read the alternative information stream portion of the selected one of the plurality of alternative information streams until the next entry point of the alternative information stream portion of the selected one of the plurality of alternative information streams is reached;
    jumping within the one interleaved unit to an entry point of the portion of the other one of the plurality of alternative information streams, wherein the act of jumping comprises an act of jumping within the one interleaved unit to the entry point of the portion of the other one of the alternative information streams that corresponds to the next entry point of the alternative information stream portion of the selected one of the plurality of alternative information streams.

2. The method according to claim 1, wherein the act of determining the next entry point of the alternative information stream portion of the selected one of the plurality of alternative information streams comprises an act of reading a memory containing information on a location of the entry points.

3. The method according to claim 1, wherein the act of determining the next entry point of the alternative information stream portion of the selected one of the plurality of alternative information streams comprises an act of reading a predefined location of the record medium containing information on a location of the entry points.

4. The method according to claim 1, wherein, at the termination of each jump, the method comprises an act of:
    resetting a counter,
    wherein the act of reading comprises an act of counting the group of pictures during reading, and
    wherein the act of determining the next entry point, after a stream change command has been received, comprises an act of determining the next entry point as a first next entry point after a counter value indicates that a predetermined number of group of pictures has been read.

5. A method for reading a record medium, the method comprising acts of:
    selecting one of a plurality of alternative information streams recorded on the record medium in an interleaved manner, wherein a track of the record medium contains a succession of consecutive interleaved units, each interleaved unit comprising one corresponding portion of each one of the plurality of alternative information streams; and wherein each one the plurality of alternative information stream portions has a plurality of entry points within a given interleaved unit;
    reading the alternative information stream portion of the selected one of the plurality of alternative information streams associated with one interleaved unit;
    storing the alternative information stream portion of the selected one of the plurality of alternative information streams read into a buffer memory;
    outputting the alternative information stream portion of the selected one of the plurality of alternative information streams from the buffer memory;
    receiving a command to change to an other one of the plurality of alternative information streams;
    estimating a time needed to complete a jump and read one group of pictures;
    calculating a first next entry point to be reached by display after the estimated time has lapsed;
    jumping within the one interleaved unit to an entry point of the portion of the other one of the plurality of alternative information streams, wherein the act of jumping comprises an act of immediately jumping to an entry point of the portion of the other one of the plurality of alternative information streams, and wherein during the act of jumping, a jump is made to the calculated first next entry point.

6. The method according to claim 5, wherein the act of calculating the first next entry point comprises an act of reading a memory containing information on a location of the entry points.

7. The method according to claim 5, wherein the act of calculating the first next entry point comprises an act of reading a predefined location of the record medium containing information on a location of the entry points.

8. A method for reading a record medium, the method comprising acts of:
    selecting one of a plurality of alternative information streams recorded on the medium in an interleaved manner, wherein a track of the record medium contains a succession of consecutive interleaved units, each interleaved unit comprising one corresponding portion of each one of the plurality of alternative information streams; and wherein each of the plurality of alternative information stream portions has a plurality of entry points within a given interleaved unit;
    reading the alternative information stream portion of the selected one of the plurality of alternative information streams associated with one interleaved unit;
    storing the alternative information stream portion of the selected one of the plurality of alternative information streams read into a buffer memory;
    outputting the alternative information stream portion of the selected one of the plurality of alternative information streams from the buffer memory;
    receiving a stream change command to change to an other one of the plurality of alternative information streams;
    jumping within the one interleaved unit to an entry point of the portion of the other one of the plurality of alternative information streams, wherein, at the termination of each jump, the method comprises an act of starting a timer having a predetermined duration;

and wherein, after the stream change command has been received during the act of receiving, a next entry point is determined as a first entry point after timeout of the timer.

9. Drive for reading a record medium, the drive being adapted to select one of a plurality of alternative information streams recorded on the record medium in an interleaved manner, wherein a track of the record medium contains a succession of consecutive interleaved units, each interleaved unit comprising one corresponding portion of each one of the plurality alternative information streams; and wherein each one of the plurality of alternative information stream portions has a plurality of entry points within a given interleaved unit;

read the alternative information stream portion of the selected one of the plurality of alternative information streams associated with one interleaved unit;

store the alternative information stream portion of the selected one of the plurality of alternative information streams read into a buffer memory;

output the alternative information stream portion of the selected one of the plurality of alternative information streams from the buffer memory;

receive a command to change to an other one of the plurality of alternative information streams; and jump within the one interleaved unit to an entry point of the portion of the other one of the plurality of alternative information streams, wherein the drive is further adapted to:

estimate a time needed to complete a jump and read one group of pictures;

calculate a first next entry point to be reached after the estimated jump-and-read time has lapsed, wherein, the drive is adapted to jump to the calculated first next entry point.

10. The drive according to claim 9, wherein the drive comprises a portion of an audio/video reproduction system, the drive further comprising a display device comprising at least one screen for displaying images and at least one loudspeaker for generating sound.

* * * * *